United States Patent [19]

Ogino

[11] Patent Number: 5,675,560
[45] Date of Patent: Oct. 7, 1997

[54] INFORMATION RECORDING/REPRODUCING APPARATUS WITH FUNCTION OF SEEKING LIGHT BEAM TO TARGET POSITION, AND METHOD THEREFOR

[75] Inventor: Tsukasa Ogino, Yokohama, Japan

[73] Assignee: Canon Kabushiki Kaisha, Tokyo, Japan

[21] Appl. No.: 515,215

[22] Filed: Aug. 15, 1995

[30] Foreign Application Priority Data

Aug. 22, 1994 [JP] Japan ................................. 6-196671
Jan. 9, 1995 [JP] Japan ................................. 7-001252

[51] Int. Cl.$^6$ ...................................................... G11B 7/00
[52] U.S. Cl. ............................................ 369/32; 369/44.28
[58] Field of Search ........................... 369/44.27, 44.28, 369/44.29, 32

[56] References Cited

U.S. PATENT DOCUMENTS

| | | | |
|---|---|---|---|
| 5,121,370 | 6/1992 | Yanagi | 369/32 |
| 5,343,131 | 8/1994 | Baumann | 318/561 |
| 5,428,590 | 6/1995 | Ogino | 369/44.28 |
| 5,475,663 | 12/1995 | Ogino | 369/44.28 |
| 5,483,507 | 1/1996 | Ogino | 369/44.28 |

FOREIGN PATENT DOCUMENTS

| | | |
|---|---|---|
| 0443847 | 8/1991 | European Pat. Off. |
| 4400247 | 7/1994 | Germany |
| 4-358369 | 12/1992 | Japan |
| 4-358371 | 12/1992 | Japan |

*Primary Examiner*—Nabil Hindi
*Attorney, Agent, or Firm*—Fitzpatrick, Cella, Harper & Scinto

[57] ABSTRACT

An information recording/reproducing apparatus includes an optical system, a moving device for moving a light beam in a direction to cross tracks on a recording medium by moving the optical system, and a tracking error signal detector for detecting a tracking error signal indicating a tracking error of the light beam. In the apparatus, a time interval that the tracking error assumes a predetermined value is detected. A current velocity of the optical system is obtained every time point that the tracking error assumes the predetermined value on the basis of the measured time interval and a moving distance of the optical system corresponding to the time interval. A target velocity value of the optical system is generated at the next occurrence timing of the predetermined value of the tracking error signal upon detection of the current velocity value. An acceleration value of the optical system is generated using the current velocity value and the target velocity value. The moving device is controlled on the basis of the acceleration value.

4 Claims, 15 Drawing Sheets

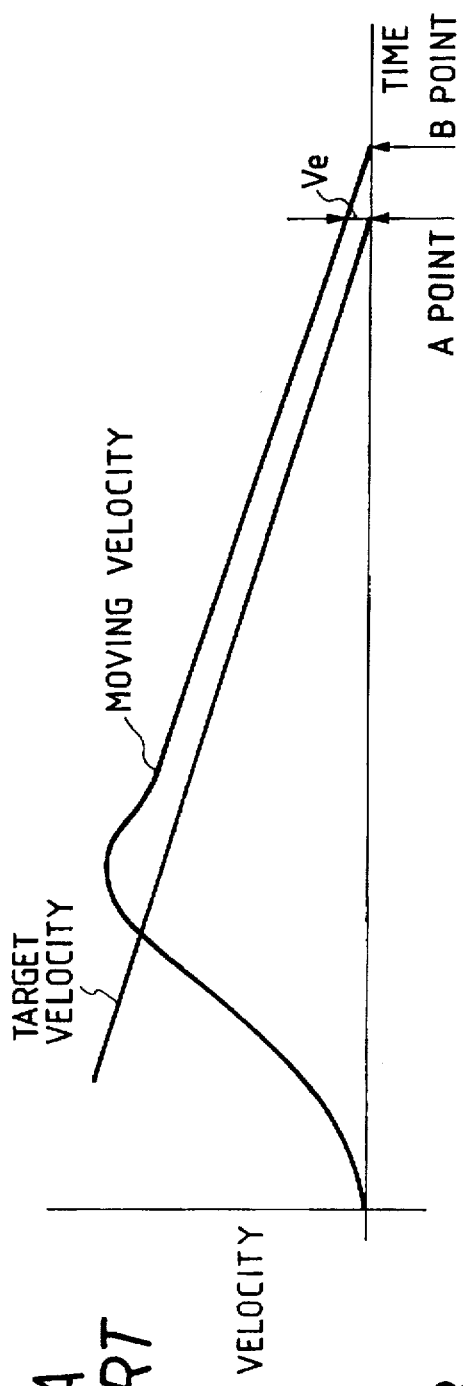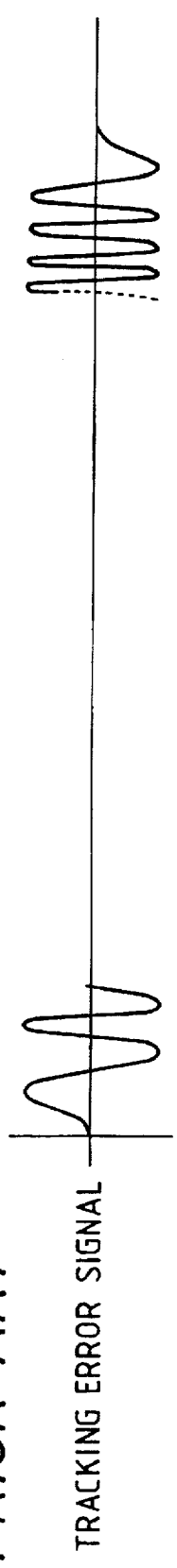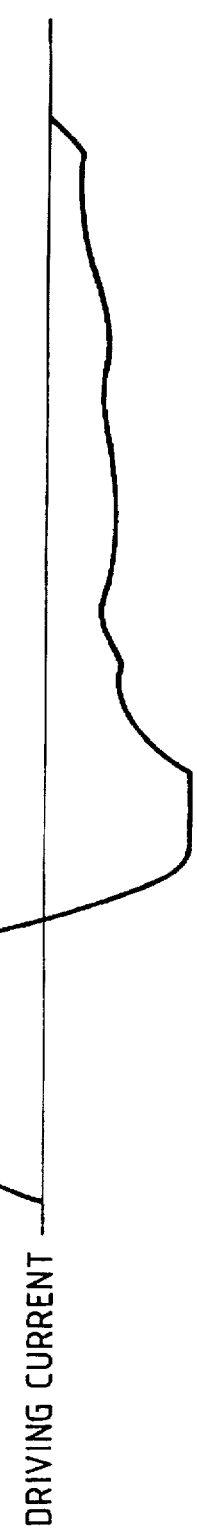
FIG. 1A PRIOR ART
FIG. 1B PRIOR ART
FIG. 1C PRIOR ART

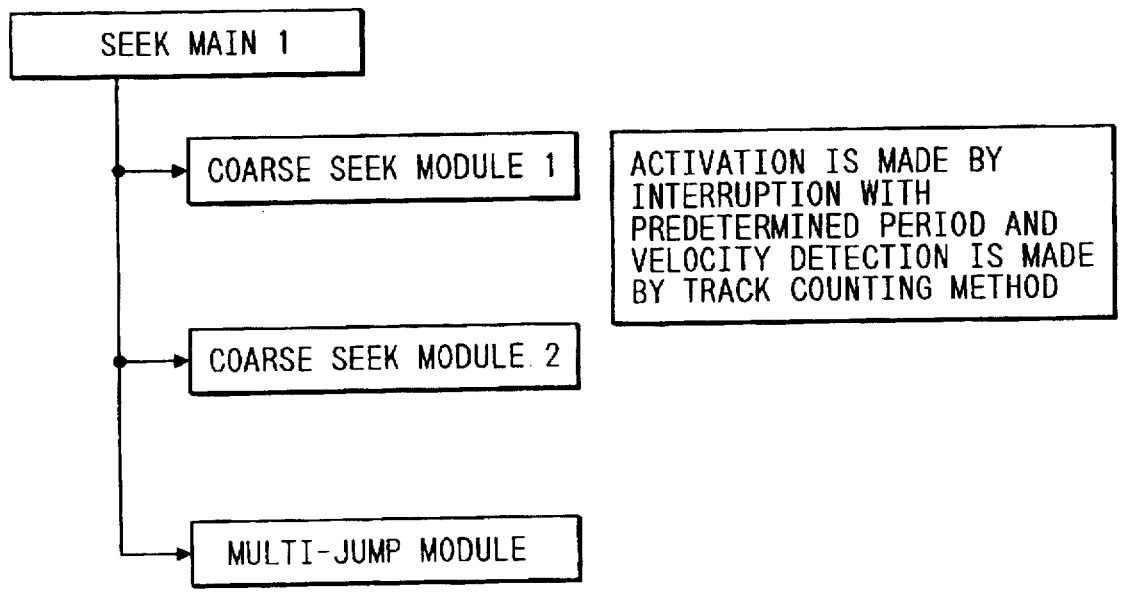
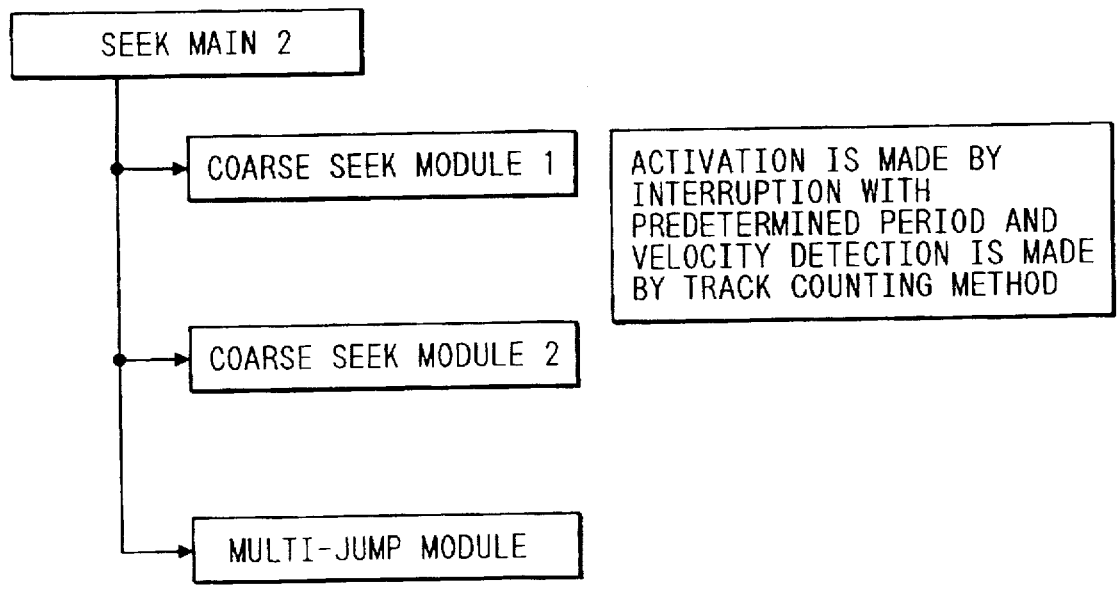

INFORMATION RECORDING/REPRODUCING APPARATUS WITH FUNCTION OF SEEKING LIGHT BEAM TO TARGET POSITION, AND METHOD THEREFOR

BACKGROUND OF THE INVENTION

1. Field of the Invention

The present invention relates to an information recording/reproducing apparatus for recording and/or reproducing information onto and/or from a magnetic disk, a magneto-optical disk, or the like and a method therefor and, more particularly, to access control of an optical head in the apparatus and method.

2. Related Background Art

Conventionally, an information recording/reproducing apparatus of this type is normally used as an external recording apparatus for a host computer, and a plurality of information recording/reproducing apparatuses are often connected to a single host computer. In such a system, the host computer issues various commands to the information recording/reproducing apparatus. Upon reception of an information recording or reproduction command, the information recording/reproducing apparatus executes command analysis processing, and then executes processing for converting a logical address into a physical address.

This processing includes address conversion to a switch address when switch processing to an alternative region is performed due to a native defect of a recording medium, and sector address conversion when a recording medium is divided into a plurality of zones, and sectors constituting each track are different in units of zones. When a target address is determined, the number of tracks required for moving a recording/reproducing head (optical system, carriage) from the current position to the target position is calculated, and a seek operation of the recording/reproducing head to the target position is performed on the basis of the calculated number of tracks.

When a seek operation of the recording/reproducing head to the target position of the recording medium is to be performed, high-speed movement of the recording/reproducing head to the target position is required. As a control system which can meet such a requirement, a system for sequentially monitoring the velocity of the head and seeking the head in accordance with a predetermined operation plan (velocity control system) is generally used. FIGS. 1A to 1C are charts for explaining the general velocity control system. FIG. 1A shows the velocity, $V_{ref}$, of the recording/reproducing head in an operation plan, and the actual moving velocity, $V_n$, of the optical head. FIG. 1B shows the tracking error signal, and FIG. 1C shows the driving current of a coarse actuator (e.g., a linear motor). The target velocity value $V_{ref}$ indicates the velocity (target velocity profile) of the recording/reproducing head in the operation plan, and is calculated in accordance with the remaining distance to the target position. The velocity $V_{ref}$ is given by equation (1) below:

$$V_{ref}=(2\cdot\alpha(S-\lambda/2\cdot N))^{1/2} \quad (1)$$

where S is the target moving distance, λ is the track pitch, α is the deceleration/acceleration, and N is the zero cross count value. In order to control the velocity of the recording/reproducing head to follow the target velocity, the current moving velocity $V_n$ of the head is sequentially detected. In order to detect the velocity of the head, different detection methods are used in correspondence with the high and low moving velocities. In the high-velocity region, a so-called track counting method is used, and the velocity of the head is detected on the basis of the number, N, of tracks crossed by the head in a predetermined sampling interval $T_s$. In this case, the velocity $V_n$ is given by equation (2) below:

$$V_n=(\lambda/2\cdot N)/T_s \quad (2)$$

where $T_s$ is the sampling time interval.

In the low-velocity region, the velocity is detected by a so-called track interval counting method. In the track interval counting method, zero cross points of a tracking error signal are detected, and a time interval $T_d$ from a given zero cross point to the next zero cross point is measured. The current velocity $V_n$ of the head is then calculated based on the measured time interval $T_d$ and the track pitch λ. In this case, the velocity $V_n$ is given by equation (3) below. Note that the distance between adjacent zero cross points corresponds to half the track pitch λ.

$$V_n=(\lambda/2)/T_d \quad (3)$$

In this manner, the different detection methods are selectively used in the high- and low-velocity regions to detect the velocity of the recording/reproducing head. When the velocity of the head is higher than a predetermined velocity value, the velocity is detected by the track counting method corresponding to the high-velocity region; otherwise, the velocity is detected by the track interval counting method corresponding to the low-velocity region. When the velocity of the head is controlled, a command value for the actuator is calculated every control period on the basis of the current velocity and the target velocity at that time, and the velocity of the head is controlled by the calculated command value. The command value, $A_{cr}$, is calculated by equation (4) below:

$$A_{cr}=K(V_{ref}-V_n) \quad (4)$$

where K is the feedback gain of a velocity control system. In the conventional system, the velocity of the head relative to the disk surface is sequentially detected using the track count value and the tracking error signal as the velocity detection methods, the command value of the actuator is calculated on the basis of the detected velocity and the target velocity, and the calculated command value is then supplied to the actuator, thereby seeking the recording/reproducing head to the target position in accordance with the predetermined operation plan (target velocity profile). In particular, in a recent apparatus based on digital servo, the target velocity shown in FIG. 1A is prepared in a memory as a target velocity table, and the command value of the actuator is calculated by reading out the target velocity from the memory every control period.

However, in the conventional seek control method, as shown in FIG. 1A, the target position is a point A, and the velocity must be zero at the point A. However, in practice, the velocity becomes $V_e$ at the point A, and a velocity deviation $V_e$ remains. Therefore, when the velocity deviation $V_e$ remains, the head overshoots to pass the point A and reach a point B. Such a velocity deviation can be minimized if the feedback gain K in equation (4) is increased. However, if the feedback gain K is too large, control becomes unstable.

The velocity control interval is another factor that largely influences the velocity deviation. If the control interval is large, since the velocity control band is inevitably narrowed, the velocity deviation increases. Therefore, the velocity deviation can be decreased by decreasing the control interval. However, since the velocity is detected based on the track count value or by measuring the time between adjacent tracks, as described above, the control interval is limited. For this reason, the velocity resolution has a lower limit. As described above, in the conventional method, the velocity deviation has a lower limit, and it is difficult to accurately seek the head to the target position.

SUMMARY OF THE INVENTION

The present invention has been made in consideration of the conventional problems, and has as its object to provide an information recording/reproducing apparatus which can minimize the velocity deviation while assuring stable control by controlling the velocity of the recording/reproducing head so that it follows a target velocity in the next control period, and a method therefor.

In order to achieve the above object, there is provided an information recording/reproducing apparatus comprising:

an optical system for irradiating a light beam onto a recording medium having a plurality of tracks;

moving means for moving the light beam in a direction to cross the track by moving the optical system;

tracking error signal detection means for detecting a tracking error signal indicating a tracking error of the light beam;

means for measuring a time of an occurrence interval of a predetermined value of the tracking error signal;

current velocity detection means for detecting a current velocity value of the optical system every occurrence of the predetermined value using the measured time and a moving distance of the optical system, which matches with the occurrence interval of the predetermined value;

target velocity value generation means for generating a target velocity value of the optical system at the next occurrence timing of the predetermined value upon detection of the current velocity value;

acceleration value generation means for generating an acceleration value of the optical system using the current velocity value and the target velocity value; and control means for controlling the moving means on the basis of the acceleration value.

There is also provided an information recording/reproducing method comprising the steps of:

irradiating a light beam onto a recording medium having a plurality of tracks via an optical system;

moving the light beam in a direction to cross the track by moving the optical system using an actuator;

detecting a tracking error signal indicating a tracking error of the light beam;

measuring a time of an occurrence interval of a predetermined value of the tracking error signal;

detecting a current velocity value of the optical system every occurrence of the predetermined value using the measured time and a moving distance of the optical system, which matches with the occurrence interval of the predetermined value;

generating a target velocity value of the optical system at the next occurrence timing of the predetermined value upon detection of the current velocity value;

generating an acceleration value of the optical system using the current velocity value and the target velocity value; and controlling the actuator on the basis of the acceleration value.

The above and other objects and features of the present invention will become apparent from the description of the embodiments.

BRIEF DESCRIPTION OF THE DRAWINGS

FIGS. 1A to 1C are charts showing the conventional seek operation state;

FIG. 3 is a block diagram showing the relationship of the seek operation routines of the first embodiment;

FIG. 8 is a block diagram showing the relationship of the seek operation routines of the second embodiment;

DETAILED DESCRIPTION OF THE PREFERRED EMBODIMENTS (First Embodiment)

Figure 2:
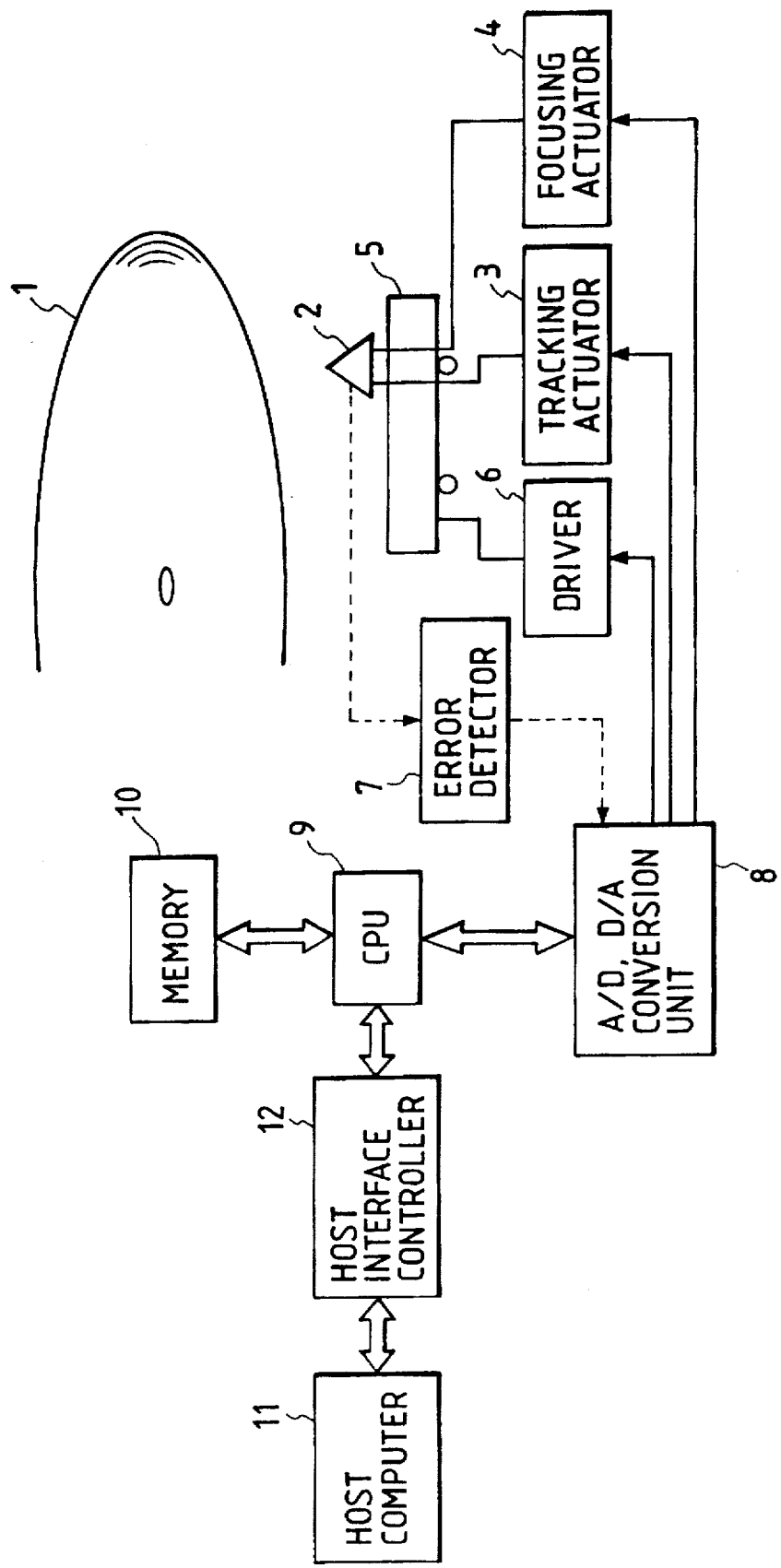
FIG. 2 is a block diagram showing an information recording/reproducing apparatus according to the first embodiment of the present invention.

The preferred embodiments of the present invention will be described in detail hereinafter with reference to the accompanying drawings. FIG. 2 is a block diagram showing an information recording/reproducing apparatus according to the first embodiment of the present invention. Note that FIG. 2 illustrates an optical disk apparatus as an example of the information recording/reproducing apparatus. Referring to FIG. 2, an optical disk 1 as an information recording medium is rotated at a predetermined velocity by a driving operation of a driving system (not shown). An optical system (optical head) 2 optically records information on the optical disk 1, or reproduces recorded information from the optical disk 1. The optical head 2 is constituted by various optical elements such as a semiconductor laser as a recording/reproducing light source, an objective lens for focusing a laser beam emitted by the semiconductor laser to a very small beam spot, a sensor for detecting light reflected by the optical disk 1, and the like.

A tracking actuator 3 moves the focusing objective lens (not shown) arranged in the optical head 2 in the radial direction of the optical disk 1. A focusing actuator 4 moves the objective lens in a direction perpendicular to the surface of the optical disk 1. The optical head 2 and these two actuators 3 and 4 are assembled in an optical head unit, which is movable in the radial direction of the optical disk 1. A linear motor 5 moves the optical head unit in the radial direction of the optical disk 1. A driver 6 supplies a driving current to the linear motor 5.

An error detector 7 detects a tracking error signal and a focusing error signal on the basis of the output from the sensor in the optical head 2. The error signals detected by the error detector 7 are converted into digital signals by an A/D, D/A conversion unit 8, and the digital signals are output to a CPU 9. The CPU 9 serves as a main controller for the optical disk apparatus of this embodiment. The CPU 9 performs systematic control such as I/O control of information, tracking control and focusing control of a light beam based on the error signals output from the error detector 7, seek control of the optical head unit by controlling the linear motor 5, and the like.

When the seek operation of the optical head unit is to be controlled, the CPU 9 calculates a command value to be supplied to the driver 6 of the linear motor 5. The calculated command value is converted into an analog value by the A/D, D/A conversion unit 8, and the analog command value is output to the driver 6. Similarly, the CPU 9 calculates command values for the tracking and focusing actuators 3 and 4, and these command values are converted into analog signals by the A/D, D/A conversion unit 8. Thereafter, these analog command signals are output to the tracking and focusing actuators 3 and 4.

A memory 10 stores a target velocity profile to be used in seek control, and is accessed (read/write accessed) by the CPU 9. A host computer 11 is connected to the CPU 9 via a host interface controller 12, which transmits/receives recording/reproducing data upon reception of commands from the host computer 11. The optical disk apparatus of this embodiment is connected to the host computer 11 as an external storage apparatus, and records and reproduces information on the basis of recording/reproducing commands issued by the host computer 11.

The seek control operation of the optical head of this embodiment will be described below. FIG. 3 shows the software arrangement in the seek control of this embodiment. In this embodiment, the seek control consists of a seek main 1 routine, a coarse seek module 1 routine, a coarse seek module 2 routine, and a multi-jump module routine, as shown in FIG. 3. The coarse seek module 1 routine is activated by an interruption at a predetermined period, and performs velocity detection by the track interval counting method.

Figure 4:
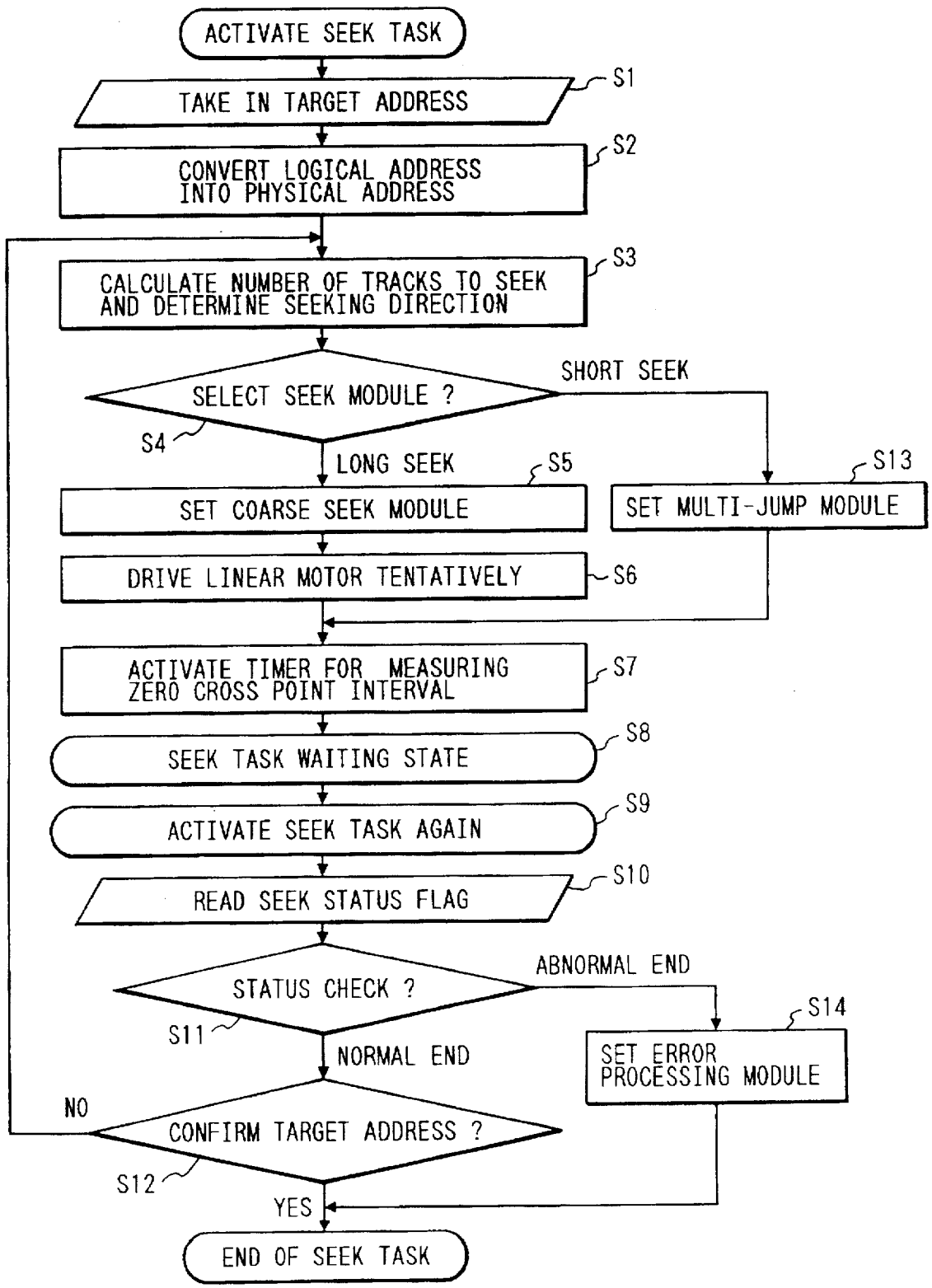
FIG. 4 is a flow chart showing the seek operation of the first embodiment.

FIG. 4 shows the seek main i routine, which is a seek task routine for managing seek modules activated in an interruption routine. Referring to FIG. 4, assume that the host computer 11 issues a recording command (or a reproduction command) to the optical disk apparatus. Upon reception of the command, in the optical disk apparatus, the seek task is activated, and the CPU 9 takes in a logical address which is transmitted from the host computer 11 and indicates a recording position (or a reproduction position) (S1). The CPU 9 converts the logical address into a physical address (S2). The current position is read from an ODC (Optical Disk Controller; not shown), and the CPU 9 also converts the current position address from a logical address to a physical address. The CPU 9 executes processing for calculating the number of tracks to seek (the number of tracks to be crossed) and the seeking direction (the direction to the inner or outer periphery) upon movement of the optical head from the current position to the target position (S3).

After the number of tracks to seek and the seeking direction are obtained, the CPU 9 selects a seek module (S4). More specifically, the CPU 9 determines based on the number of tracks to seek and the seeking direction whether a long seek (coarse seek) using the linear motor 5 or a short seek (dense seek) for moving only the optical head 2 by the tracking actuator 3 is performed. Normally, the determination result is obtained depending on the allowable range of the tilt of the optical head 2. In this case, movement across ±200 tracks or less is attained by a multi-jump module (S13) in the short seek module; when the number of tracks to seek is larger than ±200, a coarse seek module (S5) in the long seek module is used. In this embodiment, assume that the number of tracks to seek is larger than a predetermined value, and the long seek module is to be selected. Therefore, coarse seek module 1 is set (S5). In the setting operation of coarse seek module 1 in step S5 or the setting operation of the multi-jump module in step S13, the coarse seek or multi-jump module is set as an interruption module.

In the jump operation of multi-jump module in step S13, only the tracking actuator 3 as the actuator to be driven is different from the linear motor 5 as the actuator in the coarse seek module. Therefore, the operation of the multi-jump module is the same as the seek control method executed in the coarse seek module to be described below, and a detailed description thereof will be omitted.

When coarse seek module 1 is set, the CPU 9 tentatively drives the linear motor 5 in the seeking direction (S6). This is to shorten the rising time of the linear motor 5 by driving the linear motor 5 before actuation of coarse seek module 1 as an interruption routine. A timer (not shown) for measuring the track interval is activated (S7), and the seek task is set in a waiting state (S8). Thereafter, the CPU 9 mainly executes the processing other than the seek control such as switch processing, data handling processing for storing data supplied from the host computer 11 in the memory 10, and the like. The seek task is not activated again until the seek operation ends.

Figure 5:
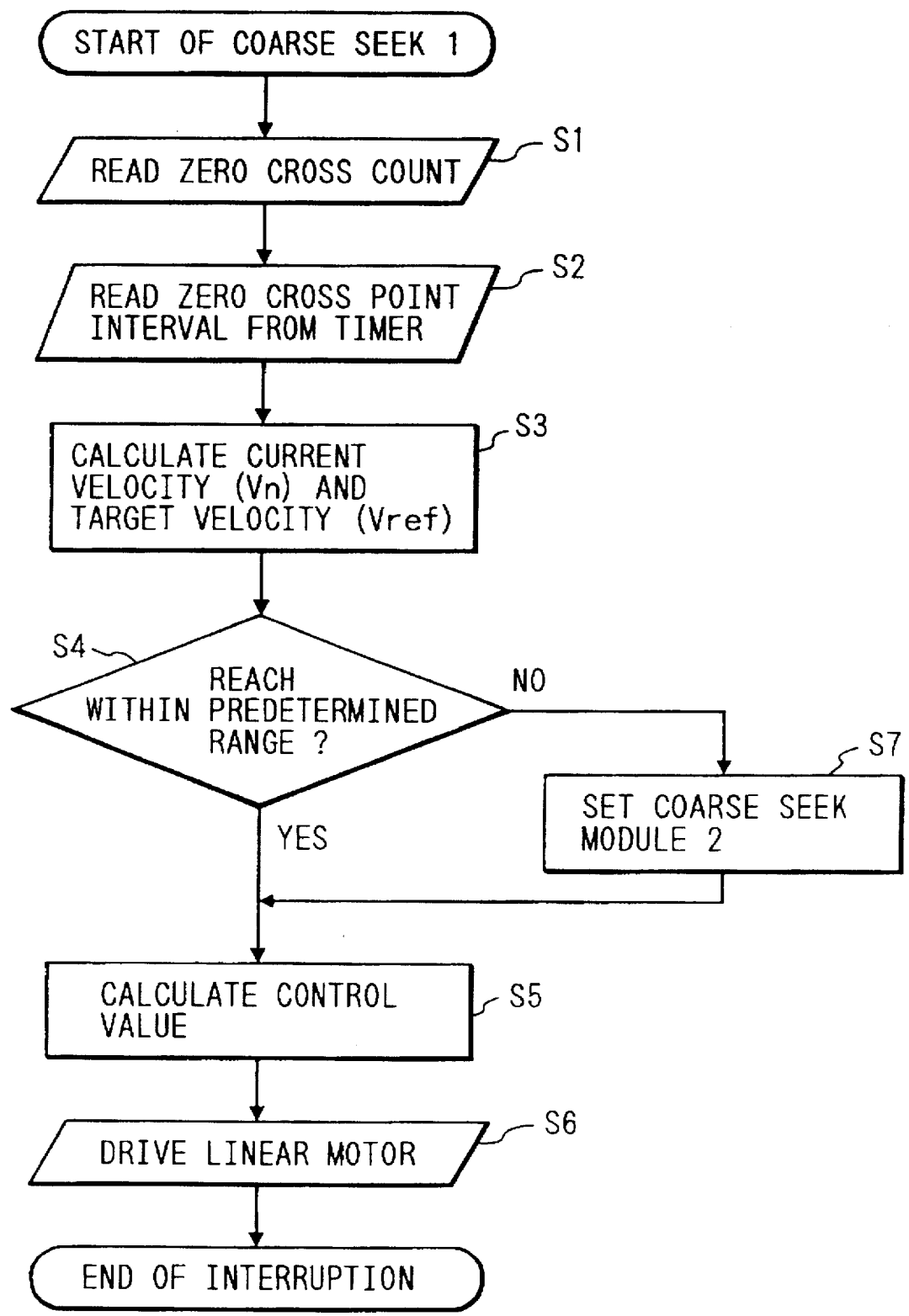
FIG. 5 is a flow chart showing the seek operation of the first embodiment.

In this case, since coarse seek module 1 is set in step S5, the interruption routine is executed at a predetermined time interval (e.g., 20 μsec) during the control other than the seek control. The coarse seek operation by the interruption routine will be explained below with reference to FIG. 5. Referring to FIG. 5, when an interruption for the seek control is generated, the CPU 9 reads the zero cross count value obtained by counting the number of zero cross points of the tracking error signal (S1), and then reads the zero cross point interval from the previously activated timer for measuring the track interval (S2). The CPU 9 calculates the remaining distance to the target position on the basis of the zero cross count value, and then calculates a target velocity $V_{ref}$ based on the remaining distance using equation (1) above (S3). Note that this operation can be simplified by preparing, in advance, the relationship between the target velocity and the remaining distance as a table in the memory 10.

The CPU 9 calculates the moving velocity, $V_n$, of the optical head using equation (3) above on the basis of the zero cross point interval measured by the timer for measuring the track interval (S3). Note that this operation can also be simplified by preparing, in advance, the relationship between the velocity and the measured interval as a table in the memory 10. In this embodiment, since the timer for measuring the track interval simply measures the zero cross point interval of the tracking error signal, the value obtained from the timer is always the latest value.

It is checked if the optical head has reached within a predetermined range (e.g., the range of two tracks before the target position) (S4). If NO in step S4, the CPU 9 calculates the control value $A_{ct}$ to be supplied to the linear motor 5 (S5). More specifically, as described above, the control value to be supplied to the linear motor 5 is calculated using equation (4) on the basis of the target velocity and the detected velocity (S5). The calculated command value is converted into an analog signal by the A/D, DA conversion unit 8, and the analog signal is output to the driver 6, thus driving the linear motor 5 (S6).

When the processing operations in steps S1 to S6 are repeated at a predetermined interruption interval, the optical head moves to the target position to follow the target velocity. When the optical head has reached within the predetermined range from the target position, the CPU 9 sets coarse seek module 2 as an interruption routine (S7). Therefore, in the next interruption, coarse seek module 2 is executed in place of coarse seek module 1 executed so far.

Figure 6:
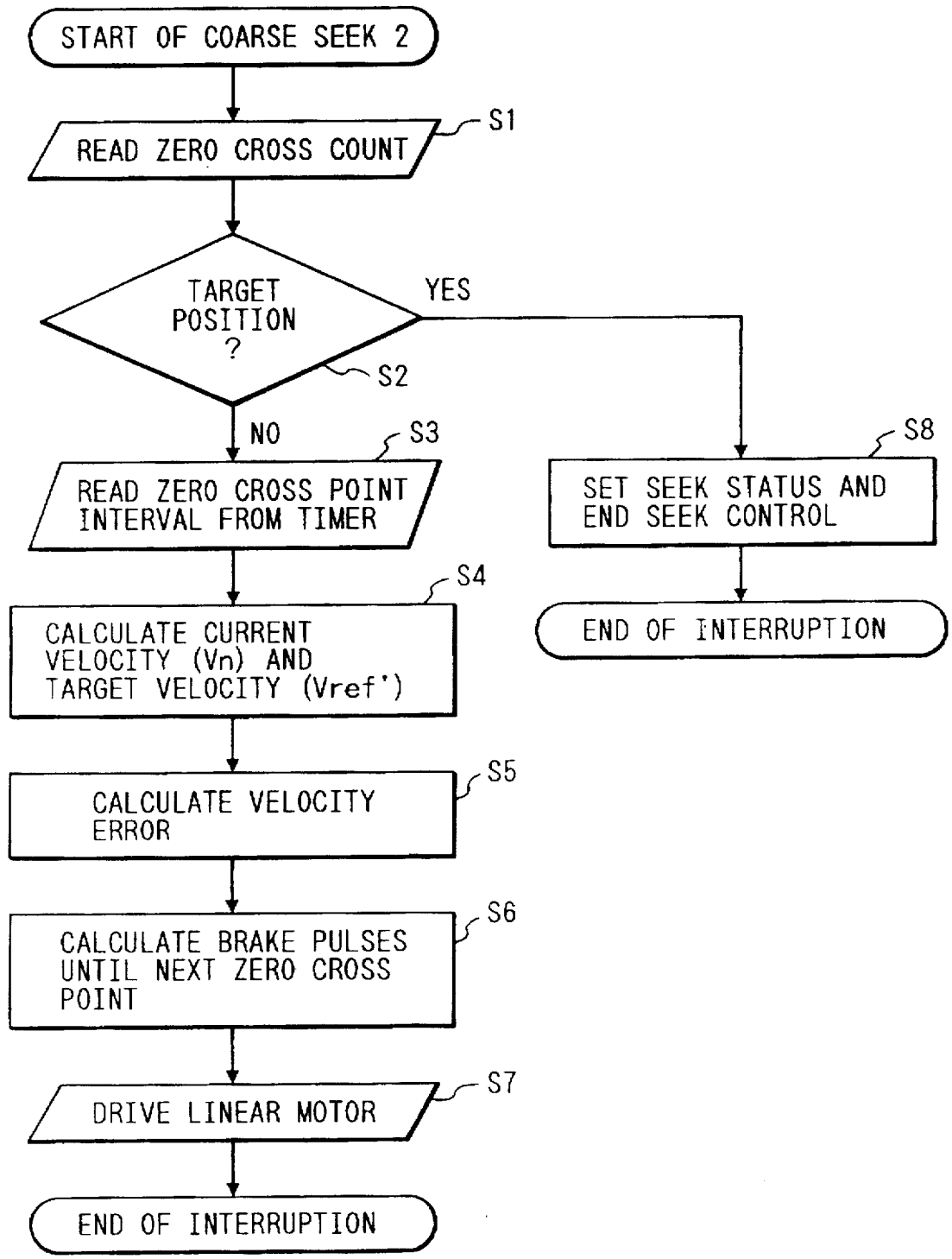
FIG. 6 is a flow chart showing the seek operation of the first embodiment.

The operation of coarse seek module 2 will be described below with reference to FIG. 6. Referring to FIG. 6, when the interruption by coarse seek module 2 is generated, the CPU 9 reads the zero cross count value obtained by counting the zero cross points of the tracking error signal (S1). Then, it is checked if the optical head has reached the target position (S2). If NO in step S2, the CPU 9 reads the zero cross point interval time from the timer for measuring the track interval (S3). The CPU 9 calculates the current velocity $V_n$ from equation (3) above using the obtained zero cross point interval time and the track pitch $\lambda$ (S4).

In this connection, the target velocity $V_{ref}$ is normally calculated based on the remaining distance to the target position. However, in this embodiment, a target velocity $V_{ref}'$ upon detection of the next current velocity, i.e., at the arrival position of the optical head in the next interruption processing, is calculated (S4). More specifically, in coarse seek module 2, seek control interruptions are generated at every zero cross point (every zero cross point of the tracking error signal), i.e., every leading and trailing edges of a binary tracking error signal obtained by binarizing a tracking error signal. For this reason, the arrival position of the optical head upon generation of the next seek interruption is 0.5 [track] ahead of the current position, and the target velocity $V_{ref}'$ at the arrival position is calculated. This velocity can be easily calculated by reading out the target velocity corresponding to the current zero cross count value +1 from the memory 10.

The CPU 9 then calculates a velocity error between the target velocity $V_{ref}'$ and the current velocity $V_n$ (S5). The CPU 9 calculates an acceleration required until the next zero cross point (next arrival position) on the basis of the velocity error, the current velocity $V_n$, and the track pitch $\lambda$, and calculates driving pulses (brake pulses) to be supplied to the linear motor 5 in correspondence with the required acceleration (S6). The calculated command value is converted into an analog signal by the A/D, D/A conversion unit 8, and the analog command value is output to the driver 6, thereby driving the linear motor 5 (S7).

The processing operations in steps S1 to S7 are repetitively executed at every zero cross point of the tracking error signal. If it is then determined in step S2 that the optical head has reached the target position, seek end status (flag) for ending seek control is set, and the interruption ends (S8).

Note that the discrimination standard used for determining in step S2 if the optical head has reached the target position is preferably set to be a position 0.5 [track] before the target position to which the optical head is to move. In this manner, a light beam can be stably led in the target position by a track lead-in operation (AT: auto tracking operation) after the end of seek control. The interruption routine then ends.

Referring back to FIG. 4, when the end status is set in coarse seek module 2, the seek task is activated again (S9). The seek status flag set in step S8 in FIG. 6 is read (S10), and a status check operation for checking if the seek control has normally ended is performed (S11). As a result, if it is determined that the seek control has normally ended, the target address is confirmed (S12). More specifically, the address of the reached position is reproduced, and it is confirmed if the reproduced address is the target address. If it is determined that the reproduced address is the target address, the seek task ends, and information is recorded at (or reproduced from) the target address.

On the other hand, if the seek status indicates that the seek control has ended abnormally, an error processing module is set (S14), thus ending the seek task. Note that errors include an auto-focus error during the seek control, a case wherein seek control cannot be normally executed due to a failure of the linear motor, and the like. In such a case, reactivation of the drive apparatus, information to the host computer, the recovery operation of recording/reproducing data, and the like are executed as error processing prior to other processing operations.

Figure 7:
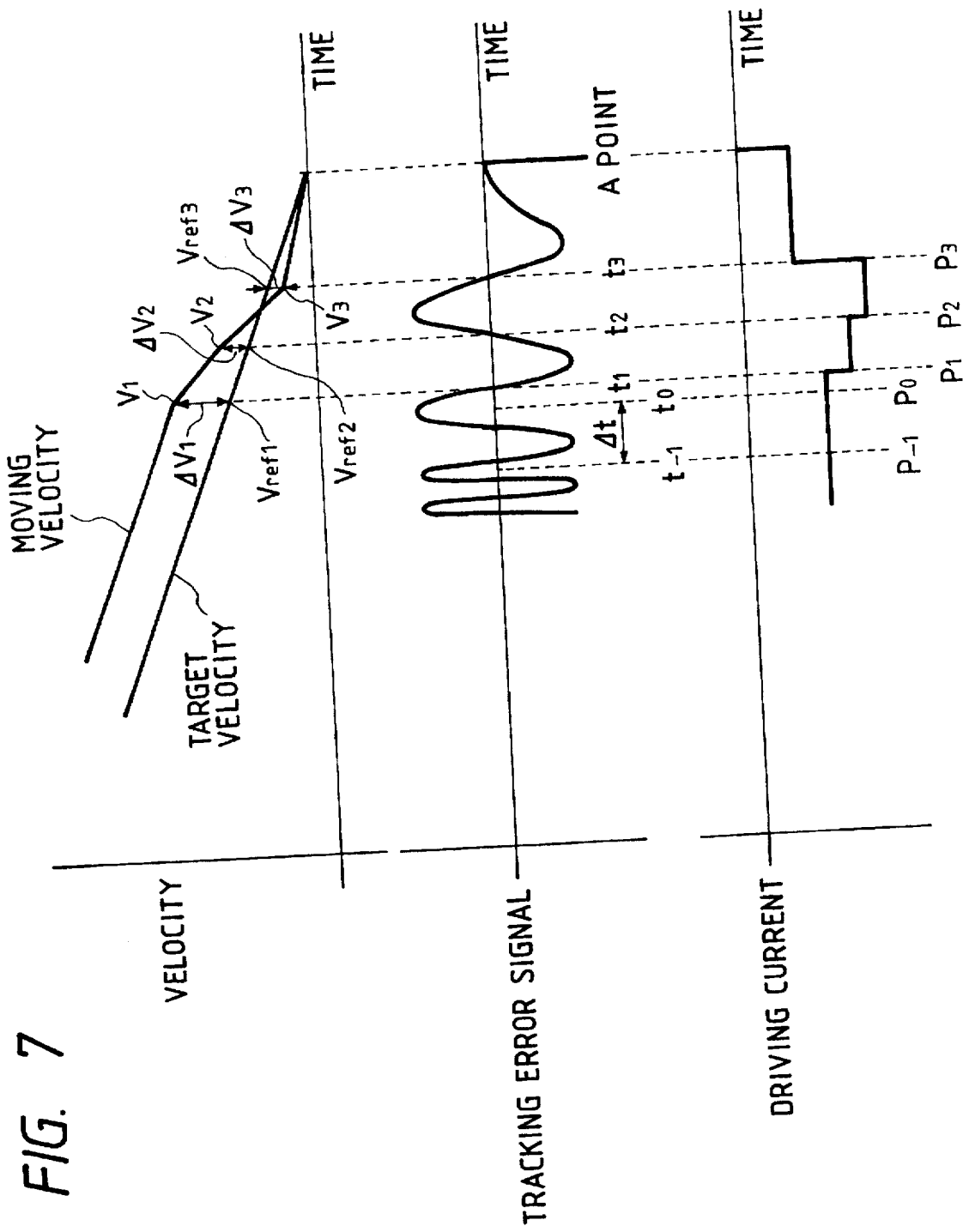
FIG. 7 is a chart showing the seek operation state according to the second embodiment of the present invention.

The operations of coarse seek modules 1 and 2 and the calculation algorithm of the driving (acceleration) signal will be described in detail below with reference to FIG. 7. FIG. 7 shows the relationship between the target velocity and the moving velocity with respect to time, the tracking error signal waveform at that time, and the driving current waveform to be supplied to the linear motor 5. In coarse seek module 1, the seek control is executed at a predetermined time interval, and at time $t_{-1}$, the driving signal is calculated from the target velocity, $V_{ref-1}$, and the detected velocity, $V_{-1}$, at that time as follows on the basis of equation (4):

$$\text{Driving signal} = K(V_{ref-1} - V_{-1}) \tag{5}$$

The driving current, $P_{-1}$, is supplied to the linear motor 5 in accordance with this driving signal.

At time $t_0$ after an elapse of the control time interval $\Delta t$, an interruption for a seek operation is generated, and coarse seek module 1 is activated again. In this case, the driving signal is calculated from the target velocity, $V_{ref0}$, and the detected velocity, $V_0$, at that time as follows on the basis of equation (4):

$$\text{Driving signal} = K(V_{ref0} - V_0) \tag{6}$$

The driving current, $P_0$, is supplied to the linear motor 5 in accordance with this driving signal. In the velocity control of coarse seek module 1, since a theoretical velocity deviation $\Delta V_1$ remains, as shown in FIG. 7, the driving signal becomes almost constant near the target position. Since the number of remaining tracks is less than 2 at time $t_0$, the seek control is switched to coarse seek module 2, and from this timing, an interruption for a seek operation is generated upon crossing of tracks, i.e., the zero cross points of a track is detected, as described above.

Therefore, at time $t_1$ corresponding to the next zero cross point, the driving signal is calculated under the control of coarse seek module 2. More specifically, the driving signal (driving current $P_1$) from time $t_1$ to time $t_2$ is calculated on the basis of the detected velocity, $V_1$, at that time, the target velocity $V_{ref2}$ at time $t_2$ as the next control period, and the distance ($\lambda/2$) between $t_1$ and $t_2$. This driving current can be calculated using, e.g., an equation below.

$$\text{Driving signal}=1/\lambda\cdot(V_1-V_{ref2})^2+2V_1\cdot(V_1-V_{ref2})/\lambda \quad (7)$$

At time $t_2$ corresponding to the next zero cross point, the driving signal is similarly calculated as follows.

$$\text{Driving signal}=1/\lambda\cdot(V_2-V_{ref3})^2+2V_2\cdot(V_2-V_{ref3})/\lambda \quad (8)$$

Note that a general formula for the driving signal in coarse seek module 2 is as follows:

$$\text{Driving signal}=[(V_n-V_{refn+1})^2/2\alpha]+[V_n\cdot(V_n-V_{refn+1})/\alpha] \quad (9)$$

where $\alpha$ is the moving distance of the optical head, which agrees with the interruption interval, i.e., the ½ track pitch if an interruption timing is generated every zero cross points, $V_n$ is the moving velocity upon interruption, and $V_{refn+1}$ is the target velocity upon next interruption.

In this manner, when the driving signal is calculated every zero cross point, and the linear motor 5 is controlled in accordance with the driving signal, the velocity deviation gradually decreases like $\Delta V_2$ at time $t_2$, $\Delta V_3$ at time $t_3$, and so on. The velocity of the optical head at the final target position A of the seek control becomes zero, and the optical head reaches the final target position A.

(Second Embodiment)

The second embodiment of the present invention will be described in detail below with reference to the accompanying drawings. Since the arrangement of the apparatus is the same as that in the first embodiment, a detailed description thereof will be omitted.

Figure 9:
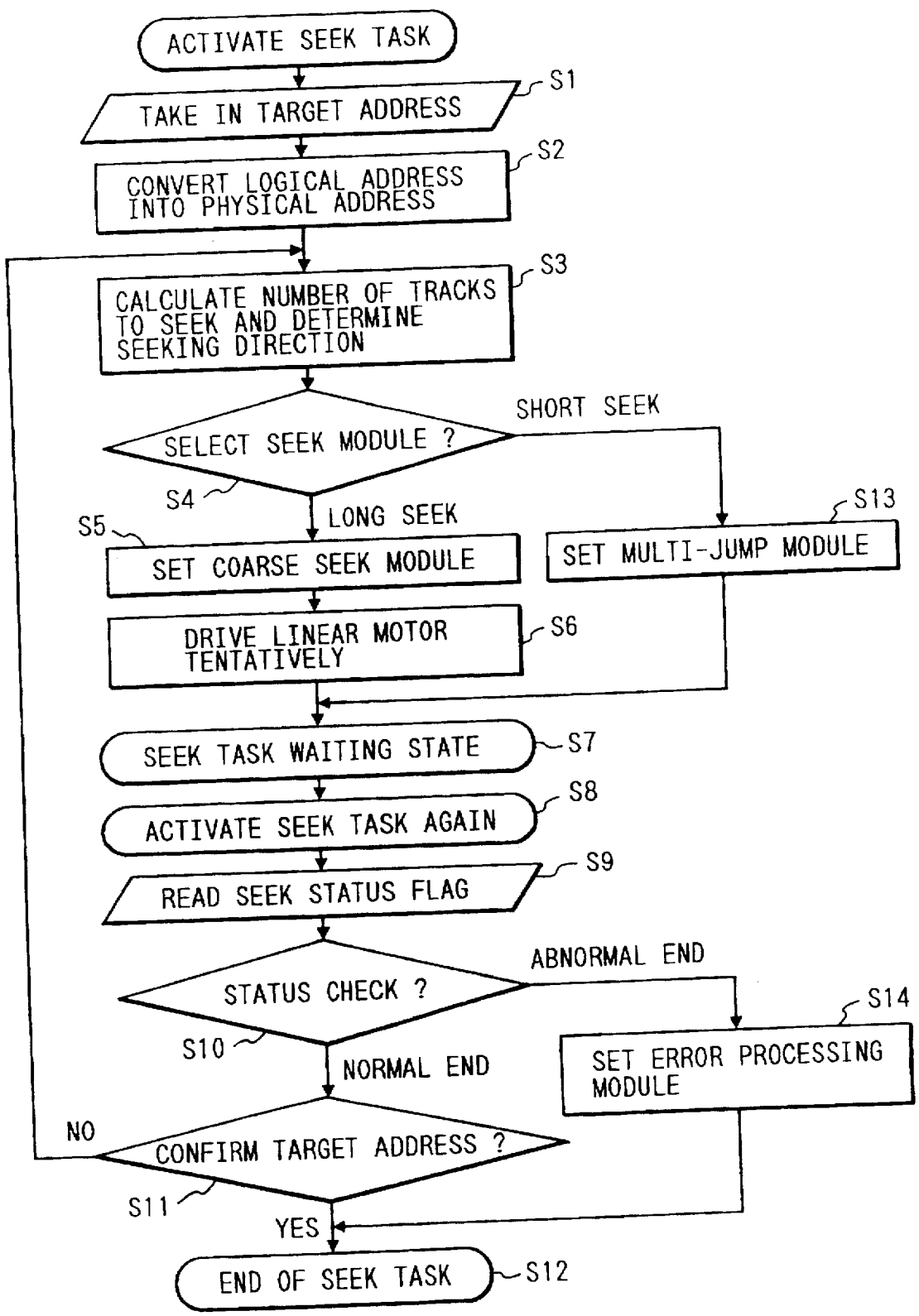
FIG. 9 is a flow chart showing the seek operation of the second embodiment.
Figure 10:
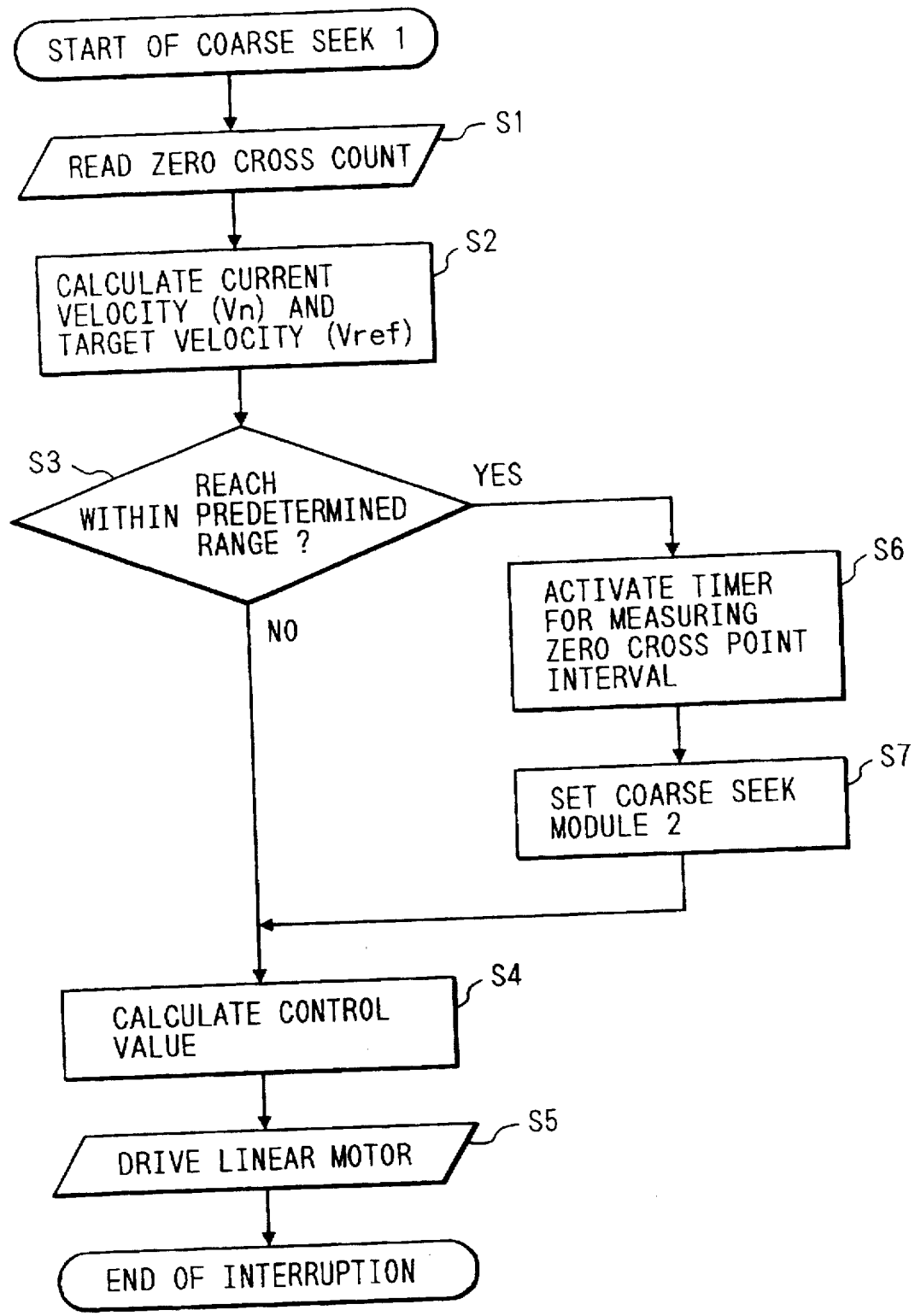
FIG. 10 is a flow chart showing the seek operation of the second embodiment.
Figure 11:
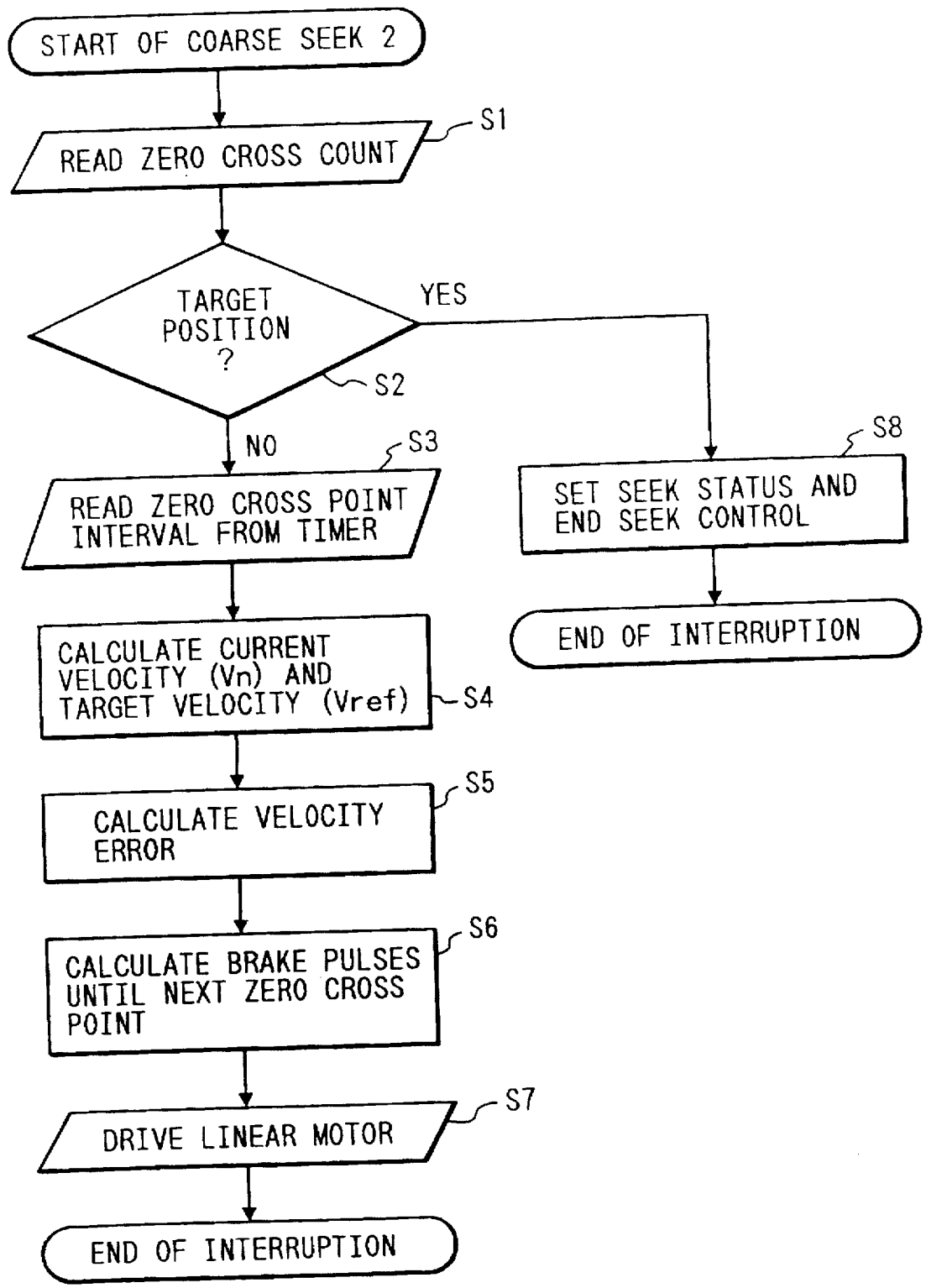
FIG. 11 is a flow chart showing the seek operation of the second embodiment.

The operation of the second embodiment will be described below. FIGS. 8, 9, and 10 are flow charts showing the control operation of the CPU 9 upon access of the optical head.

FIG. 8 shows the software arrangement of the seek control according to the second embodiment. As shown in FIG. 8, the seek control includes a seek main 2 routine, coarse seek modules 1 and 2, and a multi-jump module routine. FIG. 9 shows the seek main routine, which is a seek task routine for managing seek modules activated in an interruption routine. FIG. 10 is a flow chart showing the seek control routine as principal part of this embodiment.

Referring to FIG. 9, assume that the host computer 11 issues a recording command (or a reproduction command) to the optical disk apparatus. At this time, in the optical disk apparatus, the seek task is activated, and the CPU 9 takes in a logical address which is transmitted from the host computer 11 and indicates a recording position (or a reproduction position) (S1). The CPU 9 converts the logical address into a physical address (S2).

The current position is read from an ODC (Optical Disk Controller; not shown), and the CPU 9 also converts the current position address from a logical address to a physical address. The CPU 9 calculates the number of tracks to seek (the number of tracks to be crossed) and the seeking direction (the direction to the inner or outer periphery) upon movement of the optical head from the current position to the target position (S3). The CPU 9 then determines based on the number of tracks to seek and the seeking direction whether a long seek using the linear motor 5 or a short seek for moving only the optical head 2 by the actuator is performed (S4). Normally, the determination result is obtained depending on the allowable range of the tilt of the optical system (head). In this case, movement across ±200 tracks or less is attained by a multi-jump module (S13); when the number of tracks to seek is larger than ±200, a coarse seek module (S5) is used. The operation of the coarse seek module will be explained in detail later.

When the coarse seek module is set, the linear motor 5 is tentatively driven in the seek direction (S6). This is to shorten the rising time of the linear motor 5 by driving the linear motor 5 before actuation of the coarse seek module as an interruption routine. Upon completion of the above-mentioned operations, the seek task is set in a waiting state (S7). Thereafter, processing operations other than the seek control such as switch processing, data handling processing for storing data supplied from the host computer 11 in the memory 10, and the like are executed. The seek task is not activated again until the seek control ends.

In this case, since the coarse seek module is set in step S5, the interruption routine is generated at a predetermined time interval (e.g., 20 [μsec]) during control other than the seek control. This operation will be described below with reference to FIG. 10.

When an interruption for predetermined seek control is generated, the zero cross count value obtained by counting the number of zero cross points of a tracking error signal is read (S1). Then, the difference between the zero cross count value in the previous seek operation interruption and the current zero cross count value is calculated, and the moving velocity $V_n$ is calculated by the above-mentioned track counting method using equation (2) above. The remaining distance is calculated from the zero cross count value, and the target velocity $V_{ref}$ is calculated based on equation (1) above (S2). Note that these operations can be simplified by storing the relationship between the velocity and the number of zero cross points within a predetermined sampling time, and the relationship between the target velocity and the remaining distance as tables in the memory 10. If the remaining distance falls within a predetermined range (e.g., two tracks before the target position) (S3), the timer for measuring the zero cross point interval is activated (S6), and coarse seek module 2 is set as the interruption routine (S7). Since the operation of coarse seek module 2 set in step S7 is the same as that in the first embodiment, a detailed description thereof will be omitted. If the remaining distance falls outside the predetermined range to the target position (S3), a control value $A_{cr}$ to be supplied to the linear motor is calculated based on equation (4) above (S4).

The calculated control value is output to the A/D, D/A conversion unit 8 (S5). The control value is converted into an analog signal, and the analog signal is output to the driver of the linear motor.

The above-mentioned operations are sequentially executed at predetermined interrupt time intervals during the control other than the seek control, and a seek operation of the optical head to the predetermined range from the target position is performed by velocity control feedback in accordance with the target velocity profile.

When the optical head has reached within the predetermined range from the target position, the seek control module is switched to coarse seek module 2 described in the first embodiment (S7). When the execution module upon interruption is changed in step S7, coarse seek module 2 is executed in place of coarse seek module 1 upon next interruption.

The following operation is the same as that in the first embodiment.

(Third Embodiment)

Figure 12:
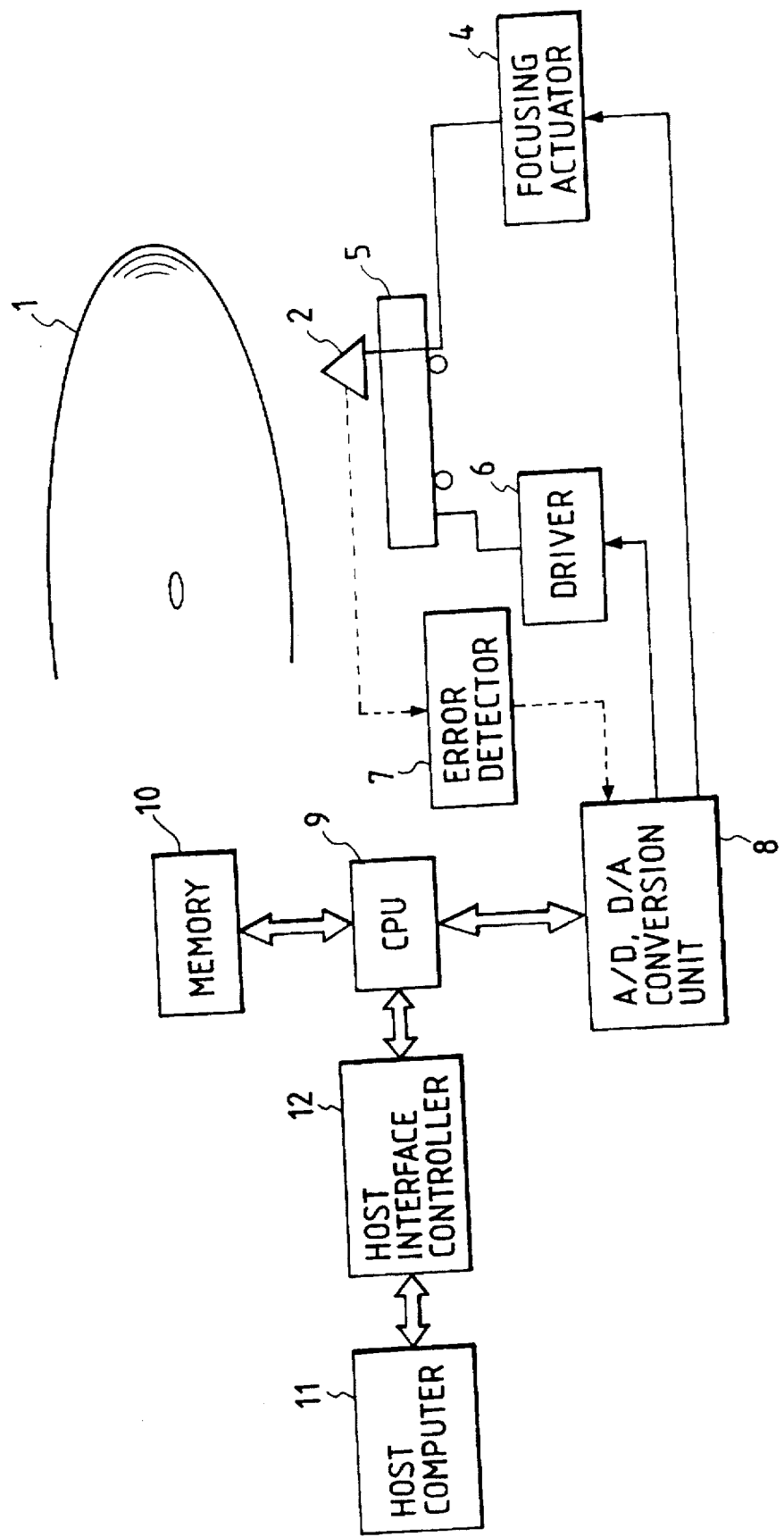
FIG. 12 is a block diagram showing an information recording/reproducing apparatus according to the third embodiment of the present invention.

An information recording/reproducing apparatus according to the third embodiment of the present invention will be described below. FIG. 12 shows the arrangement of the third embodiment of the present invention. In this embodiment, no tracking actuator 3 is used, and movement of a light beam in the track crossing direction is attained by only movement of the optical head upon driving of a linear motor 5. More specifically, the movement of the optical head in the radial direction of an optical disk 1 is attained by a single driving system. The optical disk 1, an optical system (optical head) 2, a focus actuator 4, the linear motor 5, a driver 6, an error detector 7, an A/D, D/A conversion unit 8, a CPU 9, a memory 10, a host computer 11, and a host interface controller 12 shown in FIG. 12 are the same as those in FIG. 2.

Figure 13:
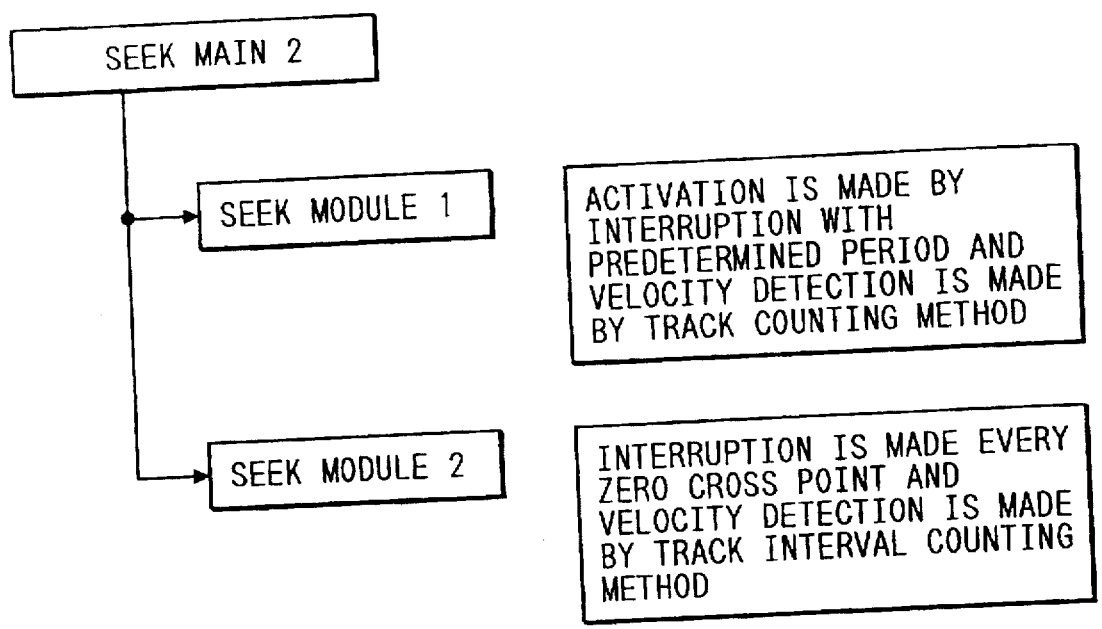
FIG. 13 is a block diagram showing the software arrangement in the seek control of the third embodiment.

FIG. 13 shows the software arrangement in the seek control of this embodiment. In this embodiment, as shown in FIG. 13, the seek control includes a seek main 2 routine, a seek module 1 routine, and a seek module 2 routine. The seek module 1 routine is activated by an interruption at a predetermined period, and performs velocity detection by the track counting method unlike in the above embodiment. The seek module 2 routine is activated by an interruption at every zero cross points, and performs velocity detection by the track interval counting method.

Figure 14:
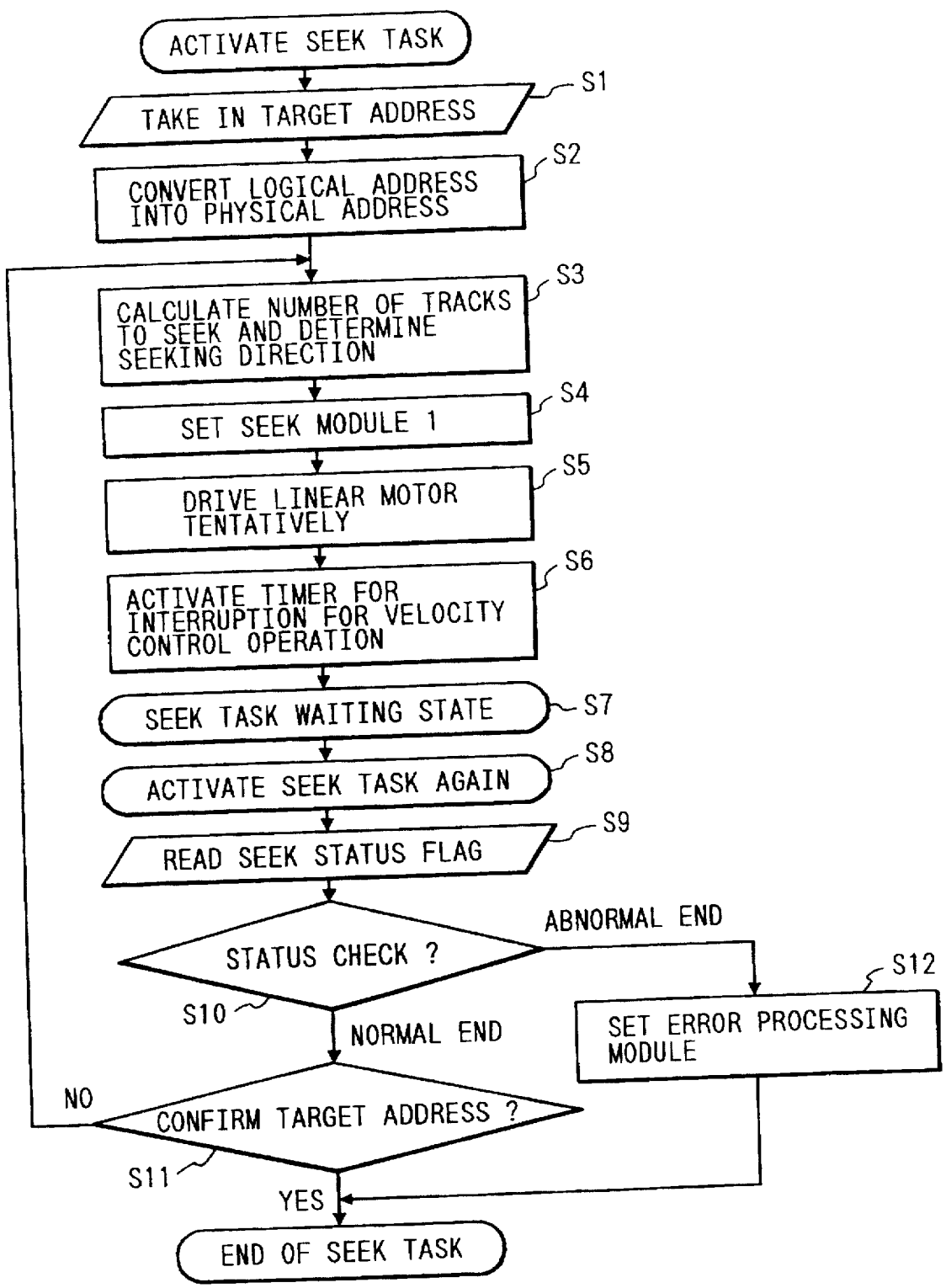
FIG. 14 is a flow chart showing the main routine in the seek control of the third embodiment.

FIG. 14 shows the seek main 2 routine, which is a seek task routine for managing seek modules activated in an interruption routine. Referring to FIG. 14, assume that the host computer 11 issues a recording command (or a reproduction command) to the optical disk apparatus. Upon reception of the command, in the optical disk apparatus, the seek task is activated, and the CPU 9 takes in a logical address which is transmitted from the host computer 11 and indicates a recording position (or a reproduction position) (S1). The CPU 9 converts the logical address into a physical address (S2). The current position is read from an ODC (Optical Disk Controller; not shown), and the CPU 9 also converts the current position address from a logical address to a physical address. The CPU 9 executes processing for calculating the number of tracks to seek (the number of tracks to be crossed) and the seeking direction (the direction to the inner or outer periphery) upon movement of the optical head from the current position to the target position (S3).

After the number of tracks to seek and the seeking direction are obtained, the CPU 9 sets seek module 1 (S4), and thereafter, tentatively drives the linear motor 5 in the seek direction (S5). This is to shorten the rising time of the linear motor 5 by driving the linear motor 5 before actuation of coarse seek module 1 as the interruption routine. A timer (not shown) for measuring the track interval is activated (S6), and the seek task is set in a waiting state (S7). Thereafter, the CPU 9 mainly executes the processing other than the seek control such as switch processing, data handling processing for storing data supplied from the host computer 11 in the memory 10, and the like. The seek task is not activated again until the seek operation ends.

Figure 15:
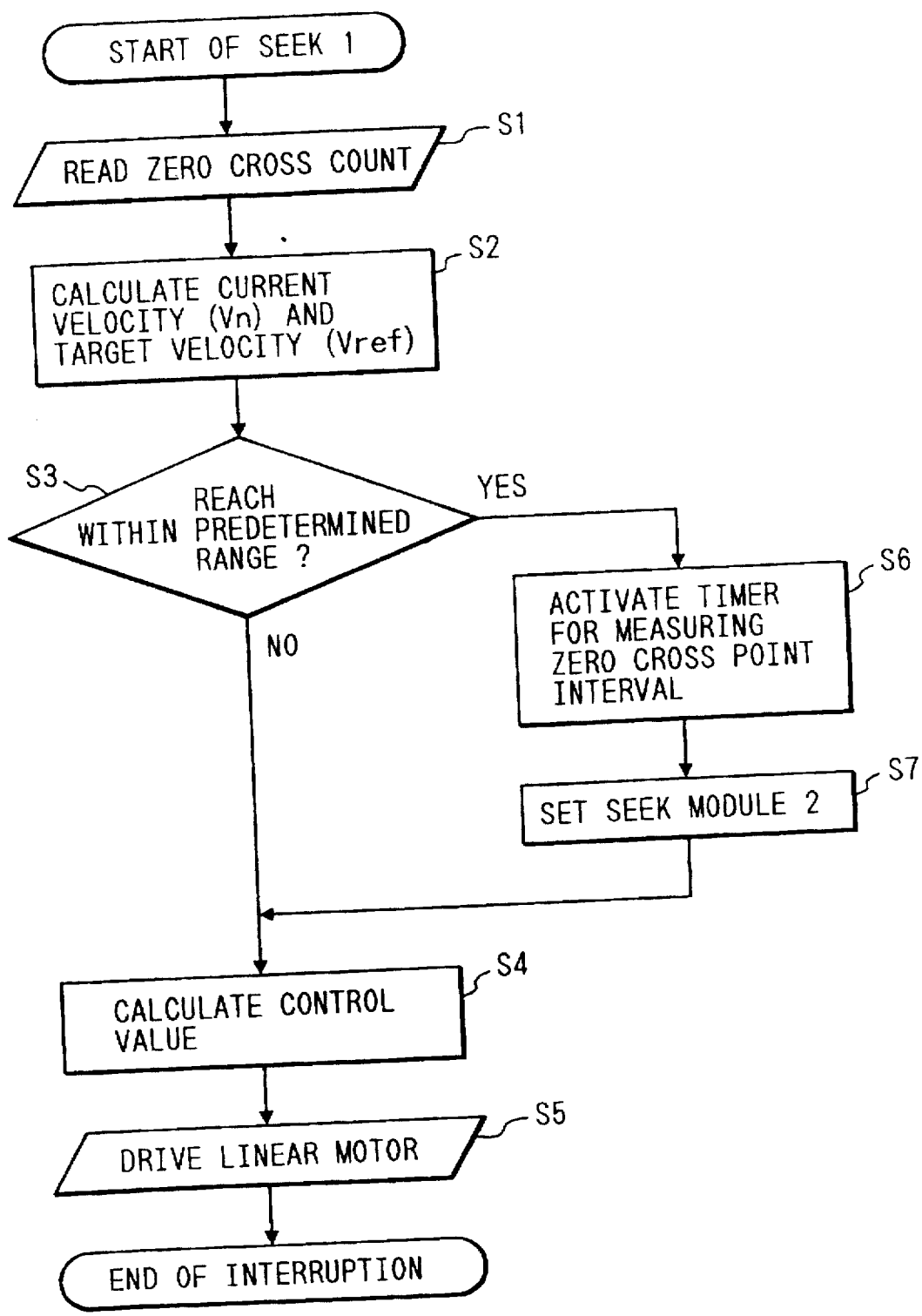
FIG. 15 is a flow chart showing the processing of seek module 1 in the seek control of the third embodiment.

In this case, since coarse seek module 1 is set in step S4, the interruption routine is executed at a predetermined time interval (e.g., 20 μsec) during the control other than the seek control. The coarse seek operation by the interruption routine will be explained below with reference to FIG. 15. Referring to FIG. 15, when an interruption for the seek control is generated, the CPU 9 reads the zero cross count value obtained by counting the number of zero cross points of the tracking error signal (S1). Then, the CPU 9 calculates the difference between the zero cross count value in the previous seek operation interruption and the current zero cross count value, and calculates the moving velocity, $V_n$, by the track counting method using equation (2) above (S2). Note that this operation can be simplified by storing, in advance, the relationship between the velocity and the count value of zero cross points of the tracking error signal in a predetermined sampling time as a table in the memory 10.

The CPU 9 also calculates the remaining distance to the target position on the basis of the zero cross count value, and calculates the target velocity, $V_{ref}$, using equation (1) above (S2). Note that this operation can also be simplified by storing, in advance, the relationship between the target velocity and the remaining distance as a table in the memory 10. It is checked if the optical head has reached within a predetermined range (e.g., the range of two tracks before the target track) (S3). If NO in step S3, the CPU 9 calculates the control value $A_{ct}$ to be supplied to the linear motor 5 (S4). More specifically, as described above, the command value to be supplied to the linear motor 5 is calculated using equation (4) on the basis of the target velocity and the detected velocity. The calculated command value is converted into an analog signal by the A/D, D/A conversion unit 8, and the analog signal is output to the driver 6, thus driving the linear motor 5 (S5).

When the processing operations in steps S1 to S5 are repeated at a predetermined interruption interval, the optical head moves to the target position to follow the target velocity. When the optical head has reached within the predetermined range from the target position, the CPU 9 activates the timer for measuring the zero cross interval (S6), and sets seek module 2 as the interruption routine (S7). Therefore, in the next interruption, seek module 2 is executed in place of seek module 1 executed so far.

Figure 16:
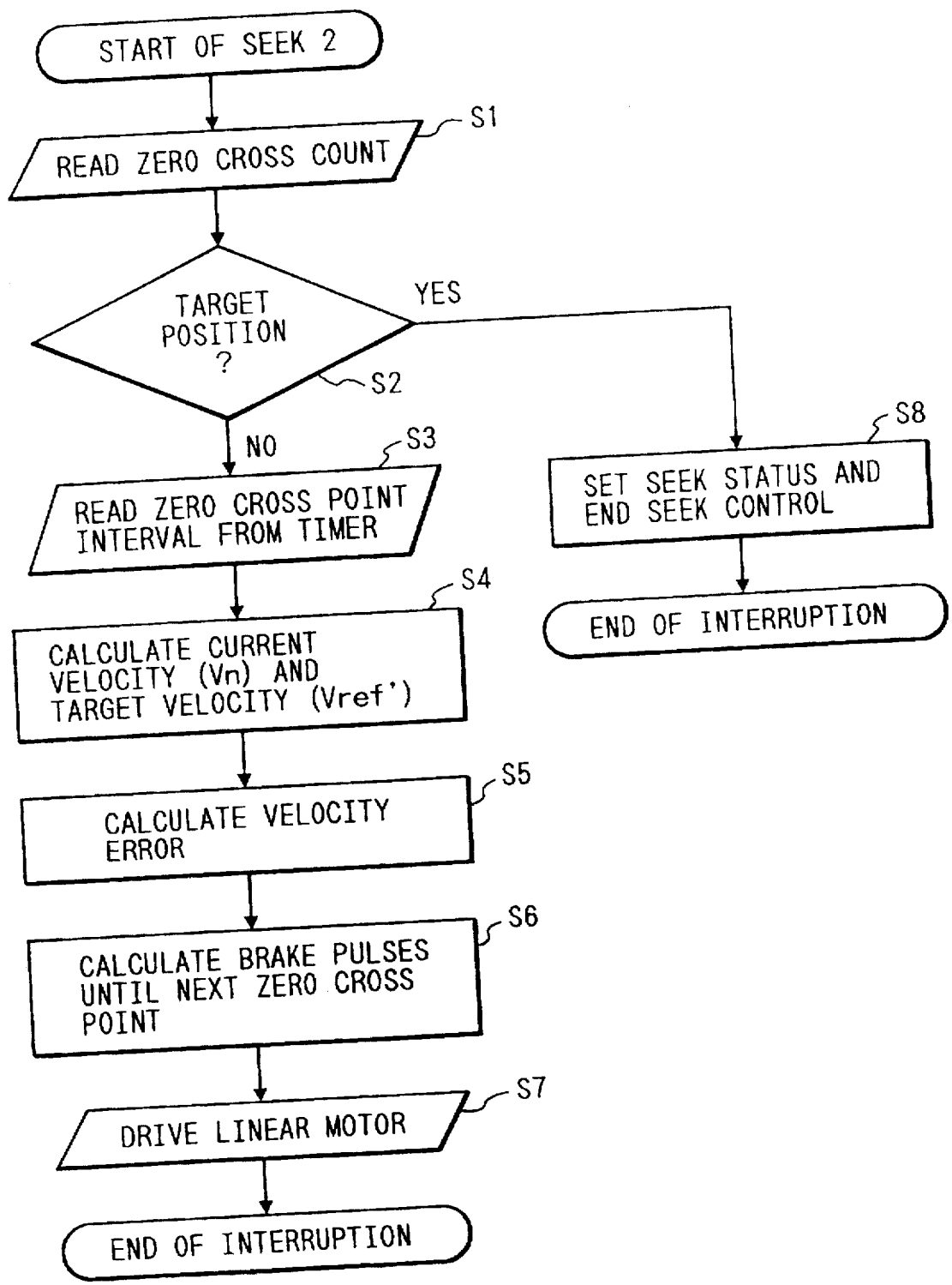
FIG. 16 is a flow chart showing the processing of seek module 2 in the seek control of the third embodiment.

The operation of seek module 2 will be described below with reference to FIG. 16. Referring to FIG. 16, when an interruption by coarse seek module 2 is generated, the CPU 9 reads the zero cross count value obtained by counting the zero cross points of the tracking error signal (S1). Then, it is checked if the optical head has reached the target position (S2). If NO in step S2, the CPU 9 reads the zero cross point interval time from the timer for measuring the track interval, that was activated in step S6 in FIG. 15 (S3). The CPU 9 calculates the current velocity $V_n$ from equation (3) above using the obtained zero cross point interval time and the track pitch λ (S4). The CPU 9 also calculates the target velocity $V_{ref}'$ at the arrival position of the optical head upon next detection of the current velocity, i.e., in the next interruption processing (S4), as in the above embodiment.

More specifically, in seek module 2, since a seek control interruption is generated at every zero cross point, the target velocity at a position, 0.5 track ahead of the current position, as the arrival position of the optical head upon next seek interruption is calculated. This velocity can be easily obtained by reading out the target velocity corresponding to the current zero cross count value +1 from the memory 10. The CPU 9 then calculates a velocity error between the target velocity $V_{ref}'$ and the current velocity $V_n$ (S5). The CPU 9 calculates an acceleration required until the next zero cross point (next arrival position) on the basis of the velocity error, the current velocity $V_n$, and the track pitch λ, and calculates driving pulses (brake pulses) to be supplied to the linear motor 5 in correspondence with the required acceleration (S6). The calculated command value is converted into an analog signal by the A/D, D/A conversion unit 8, and the analog command value is output to the driver 6, thereby driving the linear motor 5 (S7).

The processing operations in steps S1 to S7 are repetitively executed at every zero cross point of the tracking error signal. If it is then determined in step S2 that the optical head has reached the target position, seek end status (flag) for ending seek control is set, and the interruption ends (S8). Note that the discrimination standard used for determining in step S2 if the optical head has reached the target position is preferably set to be a position 0.5 (track) before the target position to which the optical head is to move. In this manner, a light beam can be stably led in the target position by a track lead-in operation (AT: auto tracking operation) after the end of seek control. The interruption routine then ends.

Referring back to FIG. 14, when the end status is set in seek module 2, the seek task is activated again (S8). The seek status flag set in step S8 in FIG. 16 is read (S9), and a status check operation for checking if the seek control has normally ended is performed (S10). As a result, if it is determined that the seek control has normally ended, the target address is confirmed (S11). More specifically, the address of the reached position is reproduced, and it is confirmed if the reproduced address is the target address. If it is determined that the reproduced address is the target address, the seek task ends, and information is recorded at (or reproduced from) the target address. On the other hand, if the seek status indicates that the seek control has ended abnormally, an error processing module is set (S12), thus ending the seek task. Note that errors include an auto-focus error during the seek control, a case wherein seek control cannot be normally executed due to a failure of the linear motor, and the like. In such a case, reactivation of the drive apparatus, information to the host computer, the recovery operation of recording/reproducing data, and the like are executed as error processing prior to other processing operations.

In this embodiment, as in the above embodiment, since the linear motor 5 is controlled for every interruption corresponding to a zero cross point so that the velocity of the optical head becomes the target velocity upon next interruption, the velocity deviation gradually decreases, as shown in FIG. 7, and the velocity deviation at the target position can be zero.

In each of the above embodiments, the optical disk apparatus has been illustrated as an information recording/reproducing apparatus. However, the present invention is not limited to this, but may be applied to, e.g., a magnetic disk apparatus.

As described above, according to the present invention, since the linear motor 5 is controlled by calculating the driving signal for every interruption corresponding to a zero cross point so that the velocity of the optical head becomes the target velocity upon next interruption, the velocity deviation at the target position can be zero. In addition, since the linear motor is controlled for every interruption by the method of attaining the target velocity upon next interruption without increasing any feedback gain or decreasing the control interval, the control can be prevented from becoming unstable, and the velocity deviation can be effectively reduced.

What is claimed is:

1. An information recording/reproducing apparatus comprising:

an optical system for irradiating a light beam onto a recording medium having a plurality of tracks;

moving means for moving the light beam in a direction to cross at least one of the plurality of tracks by moving said optical system;

tracking error signal detection means for detecting a tracking error signal indicating a tracking error of the light beam;

means for measuring a time of an occurrence interval of a predetermined value of the tracking error signal;

current velocity detection means for detecting a current velocity value of said optical system every occurrence of the predetermined value using the measured time and a moving distance of said optical system, which matches the occurrence interval of the predetermined value;

target velocity value generation means for generating a target velocity value of said optical system at the next occurrence timing of the predetermined value upon detection of the current velocity value;

acceleration value generation means for generating an acceleration value of said optical system using the current velocity value and the target velocity value; and control means for controlling said moving means based on the acceleration value.

2. An apparatus according to claim 1, wherein said acceleration value generation means generates the acceleration value on the basis of an equation below:

$$\text{Acceleration value} = [(V_n - V_{refn+1})^2/2\alpha] + [V_n \cdot (V_n - V_{refn+1})/\alpha]$$

where $\alpha$ is the moving distance, $V_n$ is the current velocity value, and $V_{refn+1}$ is the target velocity value.

3. An apparatus according to claim 2, wherein the predetermined value is zero, and the moving distance $\alpha$ is half a track pitch.

4. An information recording/reproducing method comprising the steps of:

irradiating a light beam onto a recording medium having a plurality of tracks via an optical system;

moving the light beam in a direction to cross at least one of the plurality of tracks by moving the optical system using an actuator;

detecting a tracking error signal indicating a tracking error of the light beam;

measuring a time of an occurrence interval of a predetermined value of the tracking error signal;

detecting a current velocity value of the optical system every occurrence of the predetermined value using the measured time and a moving distance of the optical system, which matches the occurrence interval of the predetermined value;

generating a target velocity value of the optical system at the next occurrence timing of the predetermined value upon detection of the current velocity value;

generating an acceleration value of the optical system using the current velocity value and the target velocity value; and controlling the actuator based on the acceleration value.

* * * * *

UNITED STATES PATENT AND TRADEMARK OFFICE
CERTIFICATE OF CORRECTION

PATENT NO. : 5,675,560
DATED : October 7, 1997
INVENTOR(S) : Ogino

It is certified that error appears in the above-identified patent and that said Letters Patent is hereby corrected as shown below:

[57] ABSTRACT:

Line 8, "every" should read --for every--.

COLUMN 2:

Line 25, "velocity,is" should read --velocity is--.

COLUMN 5:

Line 53, "i" should read --1--.

COLUMN 6:

Line 18, "end" should read --and--.

COLUMN 7:

Line 12, "A/D, DA" should read --A/D, D/A--;
Line 42, "edges" should read --edge--; and
Line 46, "[track]" should read --track--.

COLUMN 8:

Line 3, "[track]" should read --track--.

UNITED STATES PATENT AND TRADEMARK OFFICE
CERTIFICATE OF CORRECTION

PATENT NO. : 5,675,560        Page 2 of 2
DATED : October 7, 1997
INVENTOR(S) : Ogino It is certified that error appears in the above-identified patent and that said Letters Patent is hereby corrected as shown below:

COLUMN 9:

Line 18, "points," should read --point,--;
    Line 44, "as" should read --as a--; and
    Line 55, "Controller;" should read --Controller,--.

COLUMN 10:

Line 18, "[μsec])" should read --μsec)--.

COLUMN 11:

Line 22, "points," should read --point--; and
    Line 52, "khan" should read --than--.

COLUMN 12:

Line 49, "position," should read --position--.

Signed and Sealed this

Nineteenth Day of May, 1998

*Attest:*

*Attesting Officer*

BRUCE LEHMAN
*Commissioner of Patents and Trademarks*